Jan. 10, 1961   R. T. LOEWE   2,967,949
SATURABLE COMPARATOR
Filed Sept. 13, 1956   6 Sheets-Sheet 1

*INVENTOR.*
RICHARD T. LOEWE
BY
Allan Rothenberg
ATTORNEY

Jan. 10, 1961 R. T. LOEWE 2,967,949
SATURABLE COMPARATOR
Filed Sept. 13, 1956 6 Sheets-Sheet 2

INVENTOR.
RICHARD T. LOEWE
BY
ATTORNEY

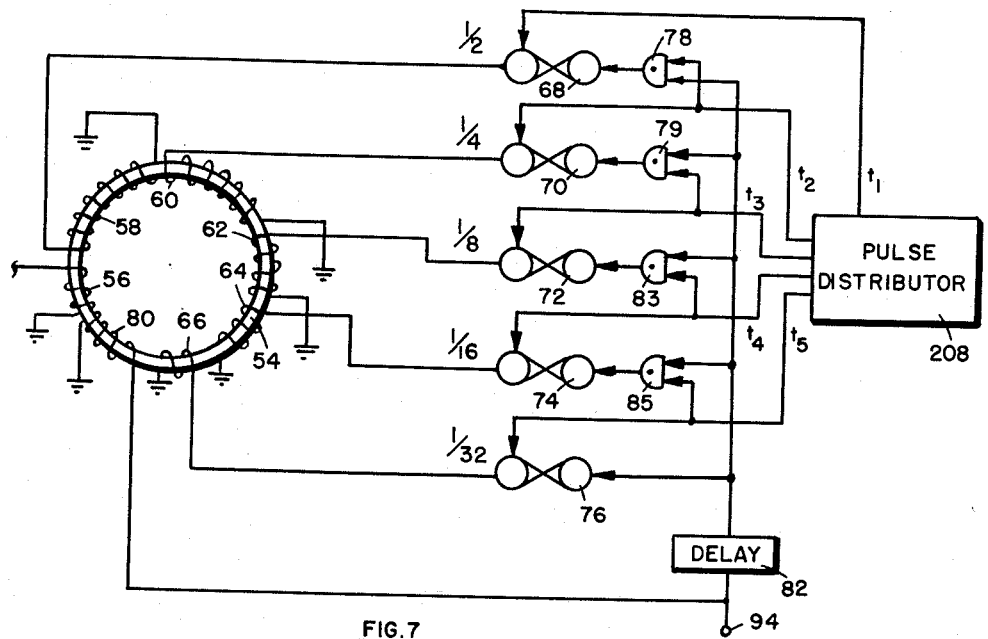
FIG. 7
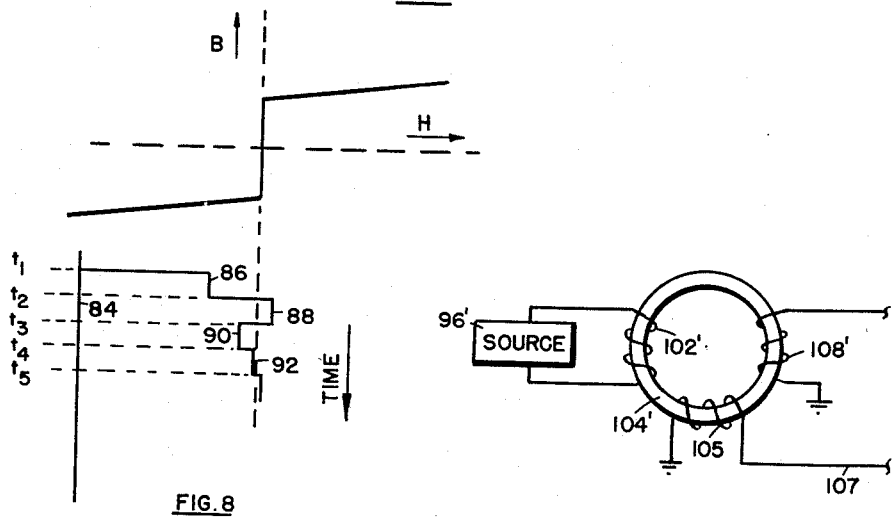
FIG. 8
FIG. 10
INVENTOR.
RICHARD T. LOEWE
BY
ATTORNEY Jan. 10, 1961 R. T. LOEWE 2,967,949
SATURABLE COMPARATOR
Filed Sept. 13, 1956 6 Sheets-Sheet 6

*INVENTOR.*
RICHARD T. LOEWE
BY
Allan Rothenberg
ATTORNEY 2,967,949
SATURABLE COMPARATOR Richard T. Loewe, Whittier, Calif., assignor to North American Aviation, Inc.

Filed Sept. 13, 1956, Ser. No. 609,713

13 Claims. (Cl. 307—88)

This invention relates to signal comparators and more particularly to signal comparators embodying a saturable device which is driven into nonsaturation from a condition far into saturation whereby the nonsaturated condition thereof will appear as a sharp discontinuity which may be detected to effect the desired comparison.

The present invention is based upon the operation of a saturable device having at least one saturated state and a substantially transient or transition state. Such device may be, for example, a magnetic or ferroelectric element having a hysteresis loop which is substantially "square" with vertical sides, sharp knees and a flat top.

A saturable device within the scope of the concepts of the present invention is herein designated as a device formed of a material having a variable physical arrangement of elemental units thereof which arrangement defines the condition or state of the device. Such arrangement may be, for example, the orientation of the elemental magnetic domains of magnetic material which define the various magnetic flux conditions of the device or it may be the orientation of the atomic structure of ferroelectric material which provides a particular electrical charge displacement. In such saturable devices, as is well-known, this physical arrangement may be varied by application of a driving force to the material. Upon increase of the magnitude of the driving force, increased rearrangement of the elemental units occurs until the driving force reaches a magnitude which has caused to exist in the material a physical condition which is a substantially maximum rearrangement of elemental units such that further increase in the driving force will have but a relatively small tendency to effect further rearrangement. Such condition of substantially maximum rearrangement is herein defined as the physically saturated condition or state of saturation of the saturable device while the condition in which the rearrangement is less than such maximum rearrangement is termed the transition or nonsaturated state of the device.

Normally the operating range of such saturable devices is limited to the linear portion of the nonsaturated region or to the entire nonsaturated region, or to a range only far enough into the saturated regions to insure two stable states of operation. This invention embodies the concept of extending the operating range of such saturable devices by an order of magnitude such that the entire nonsaturated range is only a small fraction of the total operating range, thereby allowing several new and different circuits to be designed which recognize the changes in state of the saturable variable when a composite applied driving force causes the device to pass from one saturated region thereof.

In some embodiments of this invention only one polarity of composite driving force is necessary. Thus, a device which will saturate for only one polarity of applied driving force could equally well be used. Such a unipolar saturable device is to be distinguished from common diodes and rectifiers by the fact that diodes and rectifiers do not exhibit the characteristics of a saturable physical state as defined above. In accordance with the present invention there is applied to such physically saturable device a pair of driving forces of opposite sense and each of a magnitude which is sufficient to drive said device into one of its saturated states, at least one of such forces having a maximum magnitude which is considerably greater than a minimum force required to drive the device into saturation. At least one of the driving forces is of variable amplitude whereby the net driving force, the combination of the two forces applied in opposite directions, will vary from a force which drives the device far into saturation, considerably beyond the transition state thereof, to a force which is not sufficient to saturate the device. As the net driving force decreases the device shifts into its transition state and this shift of state appears as a sharp discontinuity which is easily sensed. For a ferroelectric device the discontinuity may appear as a sharp change in charge displacement across the device while for a magnetic element the shift into nonsaturated condition appears as a sharp induced voltage pulse in a sensing winding on the element and provides a relatively large and sharp increase of impedance. The output pulse, which appears as the device shifts from saturated condition, occurs as the magnitude of one relatively time varying force exceeds the magnitude of the opposing driving force, whereby comparison of the two forces is effected relative to a reference point determined by the transition state of the device.

The principles of the invention may be incorporated in an analog-to-digital converter wherein the second or varying driving force may comprise a sequential series of weighted or incrementally varying driving pulses, the smallest of which is sufficient to drive the saturable device through the transition state in the absence of any other driving force. Thus, an analog signal applied to saturate the device in one sense or direction is sequentially compared to a digitally varying weighted driving force applied to saturate the device in the other sense, and an output pulse is provided each time the digitally weighted force exceeds the analog force.

For use as a modulator the variable driving force is provided in the form of alternating polarity carrier having a peak amplitude which will produce a driving force having alternate peaks which are greater than the predetermined maximum value of the other driving force of opposite sense which is simultaneously applied to the saturable device. The output pulses generated each time the device shifts into its transition state are utilized to decrease the peak value of the carrier force in such a manner as to maintain the peak value of such carrier driving force substantially equal to the value of the other or modulating driving force whereby the carrier force is provided with an amplitude envelope in accordance with the amplitude of the modulating force.

The principles of this invention may further be utilized for demodulating an amplitude modulated carrier signal which is applied to at saturable device to produce an alternating polarity driving force having a minimum peak amplitude sufficient to drive the device between its two saturated physical states in the absence of other driving forces. The output pulse produced for each shift of state is integrated to provide a signal which represents the peak value or the amplitude envelope of the input carrier. This integrated signal is fed back to the saturated device in such a manner as to provide the second driving force which is of a sense such as to oppose the driving force produced by swings of the carrier signal of one polarity. Thus, the device is maintained substantially in one condition of saturation and the integrated feedback signal is maintained at a value which produces a driving force substantially equal in magnitude to the peak value of the driving force produced by the carrier signal.

It is an object of this invention to provide an improved method and apparatus for comparing a pair of signals of relatively varying amplitude.

A further object of this invention is the provision of a method and apparatus for performing both summing and comparison functions in a single element.

Still another object of this invention is to provide improved apparatus for converting from analog-to-digital information.

A further object of this invention is to provide a comparator which presents an increased impedance at the time of comparison.

Still another object of this invention is to provide an improved signal measuring or modulating circuit.

A further object of this invention is to provide an improved peak detector or demodulator.

A still further object of this invention is the provision of a method of operating a saturable device for use as a signal comparator, a modulator or demodulator.

Another object of this invention is the operation of a saturable device in such a manner as to provide amplification of input information.

Other objects and many of the attendant advantages of this invention will be readily appreciated as the same become better understood by reference to the following detailed description when considered in connection with the accompanying drawings wherein, Fig. 1 represents a hysteresis curve of a magnetic element having properties adapted to the practice of this invention;

Figs. 2a and 2b graphically illustrate the operation of this invention as a comparator;

Fig. 7 is a schematic diagram of an analog-to-digital converter;

Fig. 8 illustrates the operation of the converter of Fig. 7;

Figure 9:
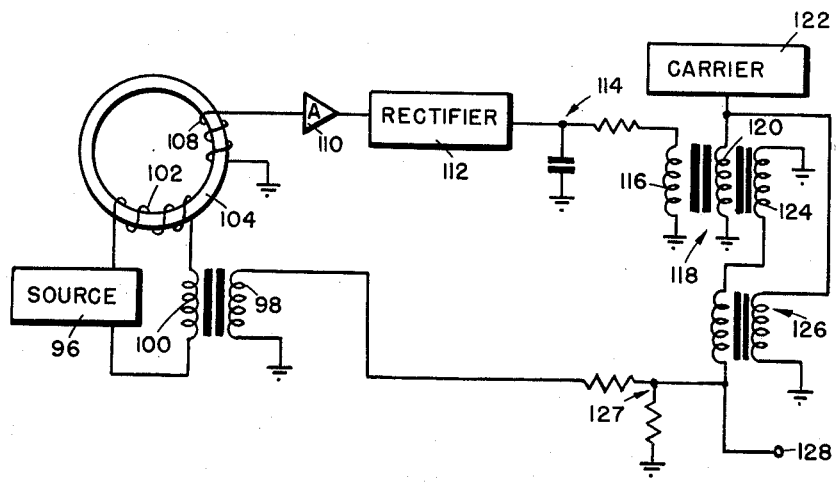
Figure 11:
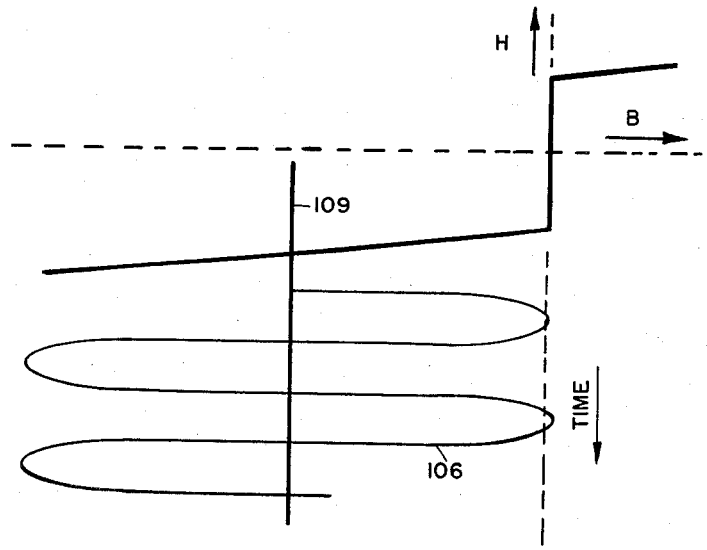
Figure 12:
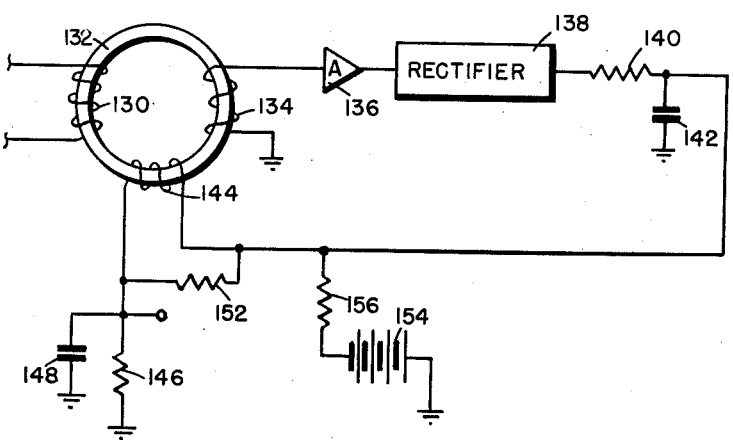

Fig. 9 schematically depicts a modulator circuit;

Fig. 10 is a modification of the circuit of Fig. 9;

Fig. 11 graphically illustrates the operation of the circuit of Fig. 9;

Fig. 12 is a schematic representation of a detector circuit; and

Figure 13:
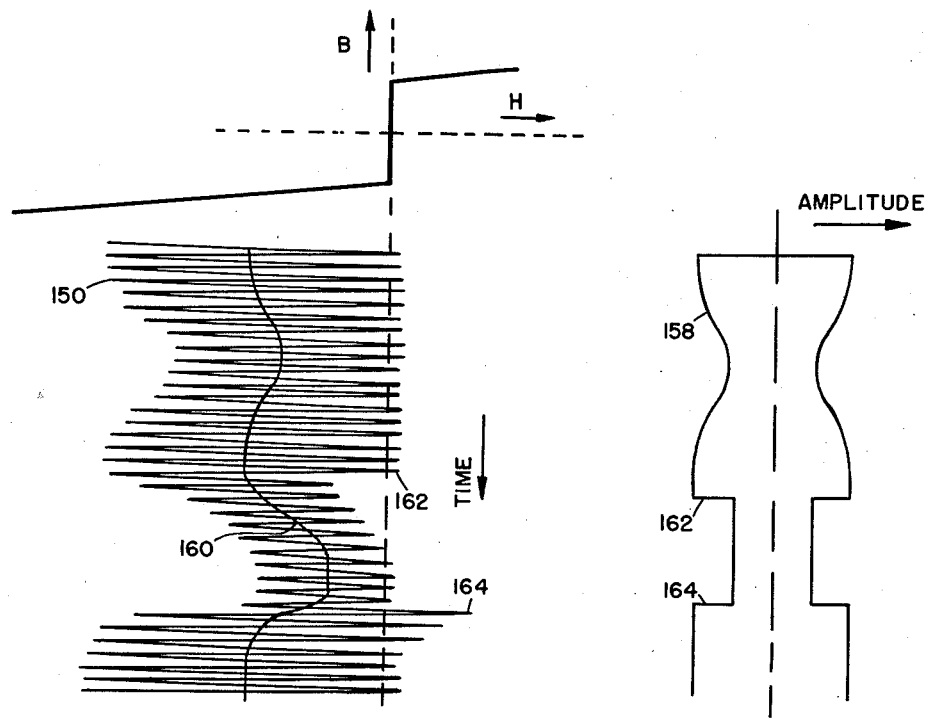

Fig. 13 graphically illustrates the operation of the circuit of Fig. 11.

Figure 1:
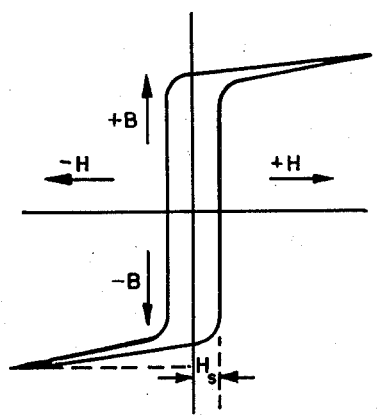
Figure 3:
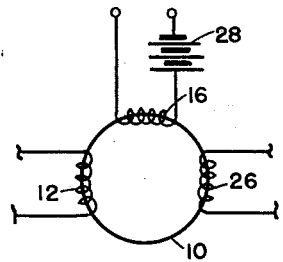
Fig. 3 is a schematic representation of a magnetic comparator.
Figure 2A:
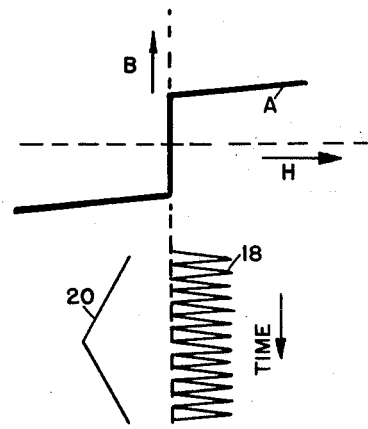
Figure 2B:
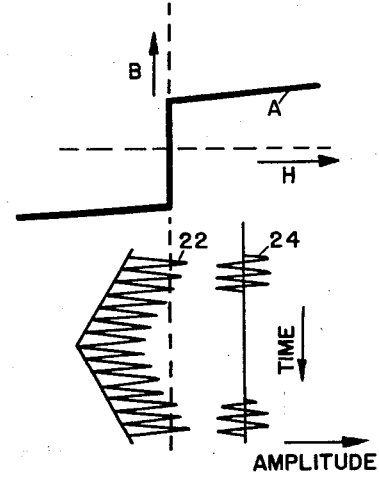

Referring to Fig. 1, the hysteresis characteristic, the variation of flux density with applied magnetomotive force, of a material suitable for use as a magnetic saturable device of this invention preferably has a generally rectangular shape with substantially vertical sides and a high ratio of residual magnetic flux density to the flux density at saturation. The curve has a flat top indicative of relatively small changes in flux density in and beyond saturation. That is, while a relatively rapid rearrangement of magnetic domains occurs as the magnetomotive force increases from zero to $H_s$, further increase of driving force will effect but a negligible additional rearrangement. The curve has sharp knees such that upon increase of the driving magnetomotive force to a minimum saturating value $H_s$ the magnetic material is driven rapidly into saturation. In accordance with the principles of this invention, the magnetomotive driving force is of such a magnitude that the magnetic material is operated far into its saturated state whether positive or negative and the minimum saturating force $H_s$ is but a small fraction of the maximum magnetomotive force applied to the device. If the driving force is allowed to vary from a value close to zero or somewhat less than $H_s$ to a value many times $H_s$ and vice versa, the shift of the device from a saturated physical state to its nonsaturated condition or transition state appears as a sharp discontinuity and a sensing coil on the device will produce the sharp voltage pulse as the device enters its transition state. With the application of such driving force which is so much larger than the minimum saturating force $H_s$ the transition state, which is actually of the near rectangular form depicted in Fig. 1, appears as a sharp discontinuity and in effect the hysteresis curve of the material appears to such large driving force substantially as the sharply discontinuous linear curve depicted as curve A in Fig. 2. In other words, the value represented by $H_s$ is so much smaller than the value of the maximum applied driving force that $H_s$ may be neglected. Thus, a magnetic saturable comparator as illustrated in Fig. 3 may have a slightly varying unipolar driving force applied to the magnetic core 10 by means of a first winding 12 thereon which is fed with an electrical signal to be compared. A second signal from a source of pulses (not shown) is fed through a second winding 16 on the magnetic element or core 10 in such a manner as to produce a series of driving force pulses 18 (Fig. 2a) which are opposite in direction to the driving force 20 produced by coil 12. Each of the pulses 18 and a predetermined expected minimum value of the force 20 has a magnitude which is sufficient to drive the core far into saturation whereby the nonsaturated region of the core effectively has a negligible width as depicted in Fig. 2a. Thus, with the components of magnetomotive force 18 and 20 applied to the core, there will be a net driving force 22 (Fig. 2b) in the core which is the absolute difference or the algebraic sum of the two applied forces. When this net force drops from a negative driving force H to a positive value exceeding $H_s$, the core enters its transition state and the pulse 24 is induced in a sensing winding 26 from whence it may be transmitted to any suitable display device or utilization apparatus. As can be seen from Fig. 2, when the pulses 18 are of a fixed predetermined magnitude there will be an output pulse 24 whenever the magnetizing force 20 is of less magnitude than the pulses 18 and there will be no output pulse whenever the force 20 is of greater magnitude. The value of $H_s$ is relatively small as compared with the magnitude of the applied driving forces and may normally be neglected. If greater accuracy is required, a positive driving force equal in magnitude to $H_s$ may be supplied to the core as by a battery 28 (Fig. 3) which feeds a D.-C. current through winding 16 whereby a positive bias is provided to compensate for the actual width of the transition state of the core. The accuracy limits of the comparator depend upon the relative values of $H_s$ and the predetermined maximum value of the magnetomotive force 20. These relative magnitudes are so chosen that the ratio of $H_s$ to the predetermined maximum of force 20 is substantially equal to the allowable error of the system. For example, if 1% accuracy is desired, a full scale value would be chosen to be 100 times the value of $H_s$.

If the signal fed to coil 12 be an unknown fixed level D.-C. current, the amplitude of the pulses 18 may be progressively increased by any suitable means such as, for example, a variable resistive network (not shown). Thus, as the pulses 18 increase from a value less than the predetermined minimum of D.-C. force 20 to a value greater than the applied force 20, the core will be driven from its saturated state and the value of the pulse 18 which causes the core to shift its state (as indicated by an output from the sensing winding) will be indicative of the magnitude of the unknown D.-C. current.

As distinguished from the ordinary diode comparator, it will be seen that the direct current input to coil 12 is presented with large reactive impedance at the time of importance when the comparison is being made. This is due to the fact that the inductance of the input winding 12 substantially increases when the core enters the unsaturated condition.

There are several well-known magnetic materials which may be utilized in this invention and magnetic material such as Deltamax manufactured by the Allegheny Ludlum Steel Corporation, is an example of one such material.

The ferroelectric materials such as barium titanate, guanidinium aluminum sulphate hexahydrate and varieties thereof as described, for example, on pages 121-125 of The Bell Laboratories Record, April 1956, comprise another group of saturable substances which have a pair of opposite sense saturated physical states and a transition or transient state therebetween. If the displacement of electric charge of such ferroelectric material is plotted against the applied field strength, the driving force, there results a ferroelectric hysteresis curve which is substantially similar to the magnetic hysteresis curve. The displacement of charge of a ferroelectric is not a single valued function of the applied electric field, but depends on the voltage history of the material. When no field is applied the material has a spontaneous or remanent displacement indicated at $P_0$ in Fig. 4, and a minimum finite electric field $E_c$, the coercive force, is required to switch the displacement from a positive value of $P_0$ to a negative value thereof. Thus, if the material is in its positive displacement condition which may be termed a positive condition of saturation, a positive driving force or electric field of magnitude F applied thereto will produce an increase in charge displacement $D_0$ whereas a negative driving force applied thereto will produce a charge displacement $D_1$, shifting the material between its two conditions of oppositely directed charge displacement from one saturated state through its transient state to the other saturated state. As in the saturable magnetic material, if the driving force applied to the ferroelectric device be substantially larger than the minimum saturating or coercive force $E_c$, the width of the transient region between $+E_c$ and $-E_c$ becomes negligible and the hysteresis curve appears in effect as the curve C in Fig. 5. Here again the transition state appears as a sharp discontinuity upon the shift of the device from either of its saturated states.

Figure 5:
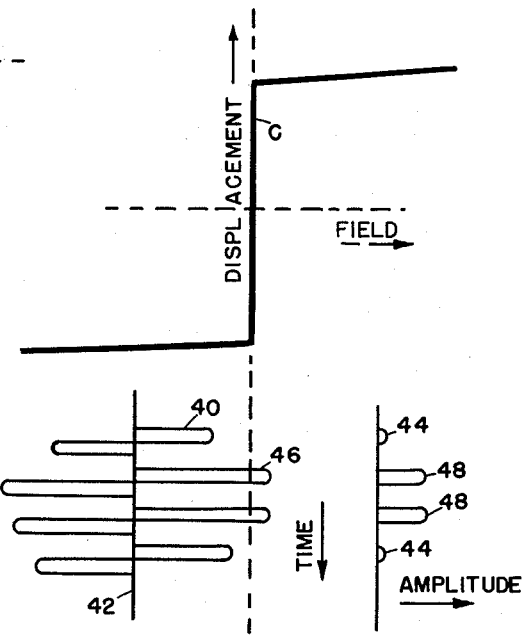
Fig. 5 illustrates the operation of a ferroelectric comparator.
Figure 6:
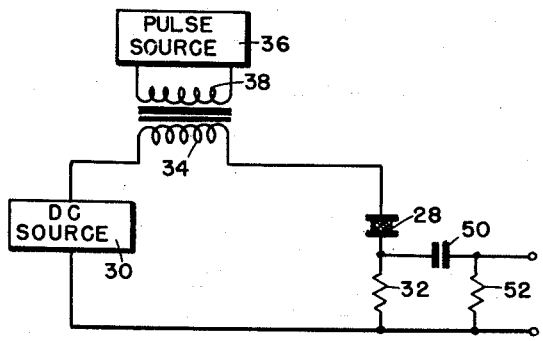
Fig. 6 is a schematic diagram of a ferroelectric comparator.

Fig. 6 illustrates a schematic circuit which utilizes a saturable electric device 28 as a signal comparator. A variable direct current signal from source 30 applies through resistor 32 and transformer secondary 34 a driving force across device 28 in the form of an electric field which has a value sufficient to drive the ferroelectric element 28 into one of its saturated states far beyond its transition state. A source of fixed amplitude pulses 36 is applied to the secondary 34 through primary 38 to provide an electric signal of alternating polarity which on the positive swings thereof has a peak value sufficient to drive the ferroelectric device far into its saturated condition. As indicated in Fig. 5, the direct current input from the source 30 may be a fixed reference value and the peak value of the pulses from source 36 may vary. Therefore, the magnitude of the net applied electric field or net driving force 40 will be the algebraic sum of the two driving forces and an abrupt change of charge displacement produces a current pulse 48 each time the net force increases in a positive direction beyond the coercive force necessary to shift the device from negative to positive condition of saturation. This current pulse is greater and more rapid than the normal pulse 44 produced by the pulse 40 which does not effect a shift of state of the device. If the net pulse 46 is of greater magnitude than the reference 42 a much larger output current pulse 48 is generated. A differentiating circuit 50—52 may be provided to enhance the diffeernce between output pulses 44 and 48 by providing an output in accordance with the time rate of change of output pulse. As in the saturable magnetic comparator the output may be fed to any suitable display device or utilization apparatus.

An analog-to-digital converter utilizing the saturable magnetic core operated in accordance with the principles of this invention, as illustrated in Fig. 7, has fed to winding 56 thereof an input analog current whose maximum magnitude is sufficient to drive the core far into saturation. The function of this circuit is to convert this analog current into a digital code which represents the ratio of the input current to full scale reference current. A plurality of weighted driving forces representing the digits in the desired code are combined with the driving force of the analog input and there is provided an output signal which indicates whether the input analog signal is greater or less than the sum of the weighted signals. The weighted signals in the digital code are applied as magnetomotive driving forces of opposite polarity with respect to the polarity of the driving force produced by the input signal by means of current pulses fed respectively to the windings 58, 60, 62, 64 and 66 which are of successively decreasing number of turns whereby the driving force produced by the respective windings 58 through 66 will be of different magnitudes in accordance with the desired code. This might also be accomplished by having all windings of same number of turns but each winding having a correspondingly weighted resistor in series therewith. Each of the windings 58 through 66 is fed with an equal magnitude current pulse from control circuitry more particularly described below and including bistable multivibrators 68, 70, 72, 74 and 76. The multivibrators are preset to zero at the beginning of a conversion cycle, a condition in which no current is supplied to the windings 58–66 and are cyclically triggered at equal time intervals $t_1$ through $t_5$ by pulses which cause the multivibrators to change state and produce a magnetomotive driving force in the core, the least of which is sufficient to drive the core far into saturation. The multivibrators are reset to zero by the respective outputs of the coincidence or "and" gates 78, 79, 83 and 85 which, as well-known, provide an output only when both of the inputs thereto occur simultaneously. Each "and" gate derives one of its inputs from the pulse which triggers the next succeeding multivibrator while the other input to each gate is derived from the sensing coil 80 which produces an output pulse whenever the sum of the driving forces from the weighted coils exceeds the analog input driving force. The pulse from coil 80 is fed through a delay 82 of such a time interval that an output pulse from coil 80 produced, for example, by the triggering of multivibrator 70 at time $t_2$ is fed back to the gates in coincidence with the next succeeding trigger pulse $t_3$. In other words, the combined delay produced by the delay line 82 and the delays inherent in the core is equal to the time interval between successive trigger pulses. Thus, for example, as indicated in Fig. 8, if an analog signal 84 is applied to winding 56, the multivibrators previously all set to zero are sequentially energized by pulses at times $t_1$ through $t_5$. The pulse at time $t_1$ produces a driving force of, for example, one half full scale value whereby the net driving force 86 in the core is not decreased an amount sufficient to drive the core into its transition state and no output appears from coil 80. The next trigger pulse at time $t_2$ produces a driving force of one quarter full scale value which adds to the driving force of coil 58, the latter remaining energized in the absence of an output from coil 80 produced by the pulse at $t_1$. Thus, the net digital driving force at the time $t_2$ is equal to one half plus one quarter full scale value as indicated at 88 which is sufficient to drive the core through its transition state and produce an output from coil 80 since for the exemplary value chosen, the analog input 84 is less than the sum of one half plus one quarter full scale. This output of coil 80 due to the delay in 82 is fed to the gate 79 of the one quarter multivibrator 70 in coincidence with the trigger pulse at time $t_3$, the next succeeding trigger pulse, which turns on multivibrator 72 to energize the one-eighth scale coil 62. Thus, when the one-eighth coil 62 is turned on, the one-quarter coil 60 is turned off and one-eighth full scale has been in net effect subtracted from the magnetomotive force yielding a net force 90 which is still too large to drive the core from its saturated state. Thus, no output pulse from coil 80 is produced by the trigger pulse at time $t_3$ and coil 62 will remain energized when trigger pulse at $t_4$ energizes coil 64 which is weighted to be of one-sixteenth full scale value. The net magnetomotive force on the core as indicated at 92 is now the input driving force plus one-half plus one-eighth plus one-sixteenth. The trigger pulse at $t_5$ adds a one thirty-second full scale force to the net driving force which drives the core into its transition state to produce an output from coil 80 which in this case is not utilized since the coil 66 is the least significant digital value of interest. There has appeared at terminal 94 a serial digital output indicative of the value of the analog input as indicated by the existence or absence of pulses from coil 80. Furthermore, the parallel digital output may be obtained from the several multivibrators at the end of the conversion cycle since the states of conduction of the several multivibrators provide a binary indication of the analog input. That is, multivibrator 68 is on, multivibrator 70 is off, and each of multivibrators 72, 74 and 76 are on. It will be seen that the single magnetic core performs both the functions of weighting and summing the digital signals and comparing the sum thereof with the analog input the necessary number of times.

Of course, a less complicated manual conversion may be obtained by simply sequentially energizing the weighted coils 58 through 66 as manually determined by the existence or absence of the pulse from coil 80. That is, coil 58 would be first energized and if an output existed from coil 80 as indicated by any suitable display device, coil 58 could be de-energized and coil 60 energized. If there were no output from coil 80 shown, coil 58 would remain energized together with the energization of coil 60 and this procedure would be continued through to the least significant digit of interest.

Figure 7A:
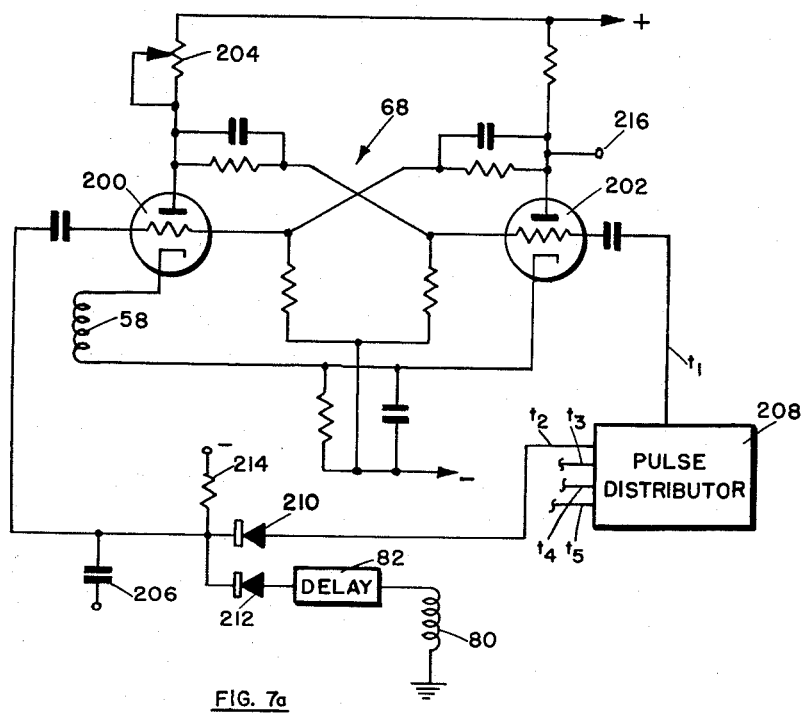
Fig. 7a is a schematic diagram of certain parts of the converter of Fig. 7.

While many different arrangements of bistable devices and gates may be utilized for energization of the windings 58 through 66, an exemplary embodiment of one such arrangement as shown in Fig. 7a may comprise a pair of electron tubes 200 and 202 arranged in the circuit shown for operation as a conventional bistable multivibrator. One of the driving coils such as coil 58 may be connected in the cathode to plate circuit of the tube 200 whereby a current, adjustable to be equal for each of the multivibrators and coils thereof by means of resistor 204, may be fed to energize the driving coil 58 when tube 200 conducts. Normally, in the "off" or nonconducting condition obtained by a negative reset pulse applied to its control grid via capacitor 206, the tube 200 is turned on by a negative pulse supplied to the grid of normally conducting (in the "off" condition of the multivibrator) tube 202 from a cyclic pulse distributor 208 of conventional and well-known design. Pulse distributor 208 may comprise, for example, a simple rotary switch which consecutively couples the grid of multivibrator tubes 202 with a negative source of potential to sequentially drive the tubes 202 of each of multivibrators 68 through 76 to cut off at equal time intervals and consequently driving tubes 200 to the "on" condition. The "and" gates may each comprise a pair of diodes 210 and 212 which are arranged to be normally conducting a current from a source of negative potential through resistor 214 which has the normally positive end thereof coupled with the diode cathodes and the grid of tube 200. Diode 210 has the anode thereof fed with an appropriate pulse from the pulse distributor 208 while the anode of diode 212 is connected to receive a negative pulse from delay element 82 in response to an output pulse from coil 80. Application of such negative pulses to the diodes 210 and 212 are sufficient to cause the diodes to cease conduction whereby if conduction of both diodes ceases there is no longer a potential drop across resistor 214 and a negative pulse appears on the grid of tube 200 driving the latter into cut off. Thus, the coil 58 will be energized when a negative pulse is applied to the grid of tube 202 at time $t_1$ which drives tube 202 into cut off and tube 200 into conduction and the coil will be de-energized upon the coincidence of application of a negative pulse to each of the diodes of the "and" gate. The parallel digital output may be derived at the end of a conversion cycle from terminals 216 connected to the plate of one tube, such as 202, of each multivibrator.

Referring now to Fig. 9, the saturable magnetic core 104 may be operated in accordance with the principles of this invention in order to measure a direct current voltage of interest or to utilize such direct current voltage for amplitude modulation of an alternating current carrier. A relatively slowly varying direct current voltage from a source 96 is coupled with a voltage of alternating polarity from the primary 98 of a transformer in the secondary 100 of the transformer. Source 96 and the secondary 100 are serially connected with the coil 102 wound upon core 104. The number of coil turns is selected in the light of the value of the applied electrical signal such that the magnetomotive force produced by either the direct current voltage or peak of the alternating current voltage is sufficient to drive the core far into the saturation in accordance with the operation heretofore explained. By operating the core far into its saturated state, the unsaturated region appears as a sharp discontinuity which is utilized to provide an output whenever the peak of the alternating current signal at one polarity is greater than the direct current signal. Whenever the total magnetizing force 106 (Fig. 11) drops below the value sufficient to keep the core in its condition of negative saturation, that is, whenever the peak value of the alternating current magnetomotive force which opposes the direct current magnetomotive force 109 is greater than the value of the latter, a signal will be induced in the output winding 108 of the magnetic core. This modulating signal is fed through amplifier 110, rectifier 112, and through a resistance-capacitance smoothing network 114 to the control winding 116 of the magnetic amplifier 118 having an input winding 120 which is supplied with the alternating carrier signal from alternating current source 122. An output coil 124 of the magnetic amplifier 118 thus provides an alternating current signal having a magnitude which varies in accordance with the value of the direct current modulating signal applied to the control winding 116. The signal from winding 124 is fed back to the primary 98, and then added to the direct current input signal in secondary 100 as explained before. Transformer 126 is utilized to balance out the residual output which exists when maximum control signal is applied to winding 116. The amplitude of the carrier from source 122 is such that the alternating current signal fed to coil 102 from secondary 100 will produce a magnetomotive force in the core having a peak value which is somewhat greater than the expected maximum value of the magnetomotive force produced by the direct current signal whereby in the absence of a modulating signal supplied to control winding 116 of the magnetic amplifier, the alternating current component of the net core driving force supplied by the magnetic amplifier will tend to increase. As the net force increases in the negative direction on one half cycle thereof, it decreases on the other half cycle and when the positive going peaks of the alternating current driving force exceed the negative driving force of the direct current signal, the core is driven into its transition state and an output pulse or series of pulses is induced in the sensing winding 108 which is fed to the control winding 116 to reduce the amplitude of the alternating current output signal from winding 124. Thus the net magnetomotive force peaks pass into the unsaturated region when the A.-C. peaks are greater than the direct current force and the alternating current output signal is reduced. Similarly, if the positive going peaks of the resulting magnetomotive force fail to pass into the unsaturated region there is no modulating signal induced in coil 108, and the output alternating current signal tends to rise at a rate determined by the decay of charge stored in network 114 which provides the modulating signal to the magnetic amplifier 118. This action tends to increase the alternating current component of the resulting magnetomotive force until the peaks begin to cross into the unsaturated region. Thus it will be seen that the feedback tends to maintain a steady state condition of the core in which the peaks of the resultant magnetomotive force extend slightly into the unsaturated region in order to maintain the charge in network 114 to provide the proper control current to the magnetic amplifier. The amount by which these peaks extend into the unsaturated region will depend on the loop gain and input signal level.

High gain or increased modulation can be achieved with the circuit of Fig. 9 by utilizing a high step down ratio in the transformer 98, 100 or by decreasing the percentage of feedback which may be effected by varying the resistors of network 127. It will be seen that there appears at terminal 128 an alternating current output which comprises the alternating current carrier amplitude modulated by the direct current voltage from source 96. If the direct current source 96 is a condition responsive network such as a conventional thermocouple measuring circuit, the thermoelectromotive force will be substantially balanced out electronically without the requirement of any mechanical components which might limit the speed of response thereof. The bucking electromotive force is an alternating current signal in which only the peak value is used to buck out the direct current voltage of interest. Thus, the voltage in the measuring circuit is balanced out only at the peak of the alternating current signal and the comparison occurs at the time when the direct current is bucked out. Thus, there is provided a low impedance, high gain alternating current output having a peak value proportional to the direct current voltage produced by the measuring circuit 96.

While the summing of alternating and direct components in the circuit of Fig. 9 provides a voltage summation which is preferably utilized when the analog input is a voltage from a low impedance source 96, the circuit may be readily modified as indicated in Fig. 10 to provide the summation in the core itself, an arrangement which would be preferable in the case of an analog current input from a high impedance source 96'. The core 104' is driven by the magnetomotive force produced by input coil 102' which is energized by the analog input current. Sensing winding 108' is similar to the winding 108 and feeds the same modulating circuitry 110 through 128 as described in connection with the circuit of Fig. 9. The alternating current feedback from the magnetic amplifier in this instance, however, is provided through lead 107 to a third winding 105 on the core rather than to the transformer primary 98 as in Fig. 9. In this way each of the windings 102' and 105 produce the opposite sense saturating forces which are summed in the core itself; otherwise, the operation of this embodiment is substantially similar to that described in connection with Fig. 9.

The saturable magnetic element may be operated in accordance with the principles of this invention as a demodulator or peak detector as illustrated in Fig. 12. One of the driving forces is supplied from a source (not shown) in a form of an amplitude modulated signal of alternating polarity fed through coil 130 on magnetic core 132 to produce a driving force having a minimum peak amplitude sufficient to drive the core between its opposite sense saturated states. Sensing winding 134 produces an output pulse each time there is a change of flux in the core, or each time the driving force enters the non-saturated area. These pulses are fed through amplifier 136 and rectifier 138 to the resistance-capacitance integrating circuit 140, 142 from whence a direct current signal is fed back to second driving coil 144 on the core to produce a negative magnetomotive force which opposes the positive going swings of the driving force produced by the carrier input. The direct current signal output appears across a load resistor 146 which may be filtered for carrier frequency by a capacitor 148. The output current from the integrator 140, 142 follows the peak value of the input signal which is fed to winding 130 by virtue of the negative feedback arrangement. The circuit tends to maintain the peak value of the magnetizing force due to the carrier signal input applied to winding 132 substantially equal to or slightly greater than the magnetizing force caused by the current applied to the feedback winding 144 as illustrated in Fig. 13. The net magnetizing force 150 in the core is the sum of the ampere turns of windings 130 and 144 designated as $N_1I_1$ and $N_3I_3$, respectively. Whenever the resultant magnetizing force 150 drops below the minimum value required to saturate the core a signal is induced in winding 134. This signal is amplified, rectified and integrated, the integrator having a discharge time constant short enough to follow the envelope of the modulated carrier input signal. The discharge current from the integrator is the output current of the circuit and is applied to winding 144 in such a manner as to produce a magnetomotive force in the core which is substantially equal and opposite to the peak value of the driving force produced by winding 130. Thus, the circuit tends to maintain the peak value of $N_1I_1$ equal to $N_3I_3$, neglecting the value of the minimum saturating force $H_s$ which is but a negligible fraction of the peak value of $N_1I_1$. Thus $I_3$, the current in coil 144 and load 146, is equal to the ratio of $N_1$ to $N_3$ times the peak value of $I_1$. This provides the desired output relation between the input current peak $I_1$ and the output current $I_3$. It will be seen that the desired amplification may be provided by choosing a turns ratio of coil 130 to coil 144 which is greater than unity. Further amplification can be accomplished by feeding only a fraction of the output current of the integrator through coil 144 by providing a dividing or shunt resistor 152 connected across coil 144. Correction for the value of $H_s$, neglected in the above considerations, may be effected by, for example, providing a magnetic bias from source 154 through resistor 156 and coil 144 whereby a steady current is produced in coil 144 which diminishes the output current by an amount sufficient to produce the minimum saturating force $H_s$ in the core. As indicated in Fig. 13, the circuit tends to clamp one edge of the envelope of the resultant magnetomotive force produced by the carrier signal 158 and the feedback force 160 produced by coil 144 at a value lying substantially at the transition state of the core. Since the driving force 160 is $N_3I_3$ and follows the peak value of the driving force due to the input carrier, it follows that the current $I_3$ through the coil 144 is directly proportional to the carrier envelope and comprises the desired demodulated signal.

Also illustrated in Fig. 13 is the operation of the circuit of Fig. 12 for abrupt changes in carrier amplitude. At point 162 an abrupt decrease in carrier amplitude is indicated and the consequent decrease in feedback current lags the carrier envelope by reason of the fact that the discharge time constant of the integrating circuit may be too large to more closely follow the sharp decrease in carrier signal. This operation is typical of most detector circuits. At point 164 where the carrier amplitude sharply increases, the change in output current also lags the change in carrier envelope by an amount determined by the time constant of the integrator and the loop gain of the circuit.

It will be seen that the disclosed detector circuit will accommodate both single and double ended input signals, will not be limited by the characteristics of conventional vacuum or crystal diodes, and may provide desired signal amplification. The input signal is presented with a sharply increased impedance at the point of discontinuity when the comparison is made instead of a decreased impedance as in most diode detectors. It will be seen that the provision of additional input windings such as 130 would allow the detection of the sum of currents applied to the several windings since the peaks of the individual driving forces due to signals applied to such windings would add in the core. The feedback current through winding 144 would then indicate the peaks of such sum. If desired, the several input currents could be simply weighted by varying the number of turns on the several input windings. It will be readily appreciated that the amplification of current or power may be further varied by suitable choice of amplifier 136 or by the provision of a cathode follower between the integrating circuit and the coil 144. The resistance-capacitance integrating circuit shown is exemplary only and may, of course, be replaced by functionally similar and more complicated integrating networks as will be readily apparent to those skilled in the art. In order to obtain different feedback characteristics it is apparent that the integrating network 140, 142 may be replaced by a suitable filter whereby the response, stability and accuracy of the system may be further varied.

It will be seen that the operating range of any of the above described magnetic embodiments may be increased by decreasing the cross-sectional area of that portion of the core about which the sensing coil is wound. Thus, if this portion of the core has a cross-sectional area less than the cross-sectional area of the rest of the core, the smaller area portion may be driven further into saturation for any given driving force.

Figure 4:
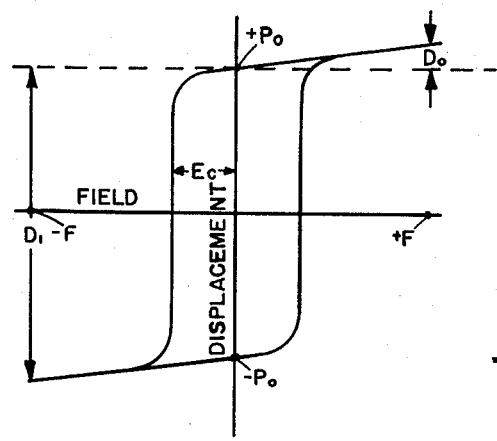
Fig. 4 illustrates the hysteresis curve of a ferroelectric material which may be utilized in the practice of this invention.

While the several embodiments of this invention have been described in connection with the operation of a saturable magnetic device, it will be readily appreciated that the functions of each of these embodiments could be accomplished by utilizing the saturable ferroelectric device operated in accordance with the principles of this invention as described in connection with Figs. 4 through 6.

There has been disclosed a novel method of operating a saturable device having a pair of opposite sense saturated physical states and a transition state therebetween which contemplates the energization of such device by a pair of opposed simultaneously applied driving forces of relatively varying magnitude, the maximum value of which is sufficient to drive the device far beyond its transition state. The two driving forces may be derived in any of several different manners from various types of signal sources whereby the invention may be practiced for comparing a pair of signals, for comparing one signal with the sum of several others, for measuring an analog voltage, or current, and for modulation or demodulation of a carrier signal. Each of these applications makes use of the fact that when the saturable device is driven far into its saturated region, the unsaturated region thereof appears as a sharp discontinuity which may be easily sensed when the composite driving force enters or passes through the region of the apparent discontinuity.

Obviously many modifications and variations of the present invention are possible in the light of the above teachings. It is therefore to be understood that within the scope of the appended claims the invention may be practiced otherwise than as specifically described.

I claim:

1. A comparator comprising a saturable device having a saturated physical state and a transition state, means for applying to said device a first driving force of a sense and maximum magnitude sufficient to drive said device into said saturated state considerably beyond said transition state, means for applying to said device during the application of said first driving force a second driving force of a sense and maximum magnitude sufficient to drive said device into said transition state, means for sensing the change of state of said device during application of said second driving force, said driving forces being several orders of magnitude greater than the minimum driving force required to saturate said device whereby said transition state appears as a sharp discontinuity at which comparison of said first and second driving forces is achieved, and feedback means responsive to said sensing means for effecting bi-directional fluctuation of one of said forces about a value substantially equal to the value of the other of said forces.

2. Apparatus of the class described comprising a saturable device having a pair of opposite sense saturated physical states and a transition state therebetween, a first signal, means responsive to said first signal for applying to said device a first driving force of a sense and maximum magnitude sufficient to drive said device into one of said saturated states considerably beyond said transition state, a second signal, means responsive to said second signal for applying to said device during application of said first driving force a second driving force of a sense and maximum magnitude sufficient to drive said device into the other of said saturated states, means for sensing the state of said device, said maximum magnitudes being many times greater than the minimum force required to saturate said device such that said transition state constitutes a sharp discontinuity between said saturated states, and feedback means responsive to said sensing means for effecting bi-directional variation of the magnitude of one of said forces to repetitively shift said device from a saturated state.

3. The structure of claim 2 wherein said device comprises ferroelectric means having oppositely directed charge displacement conditions, said saturated states comprising the respective conditions of oppositely directed charge displacement of said ferroelectric means, said transition state comprising a transient state between said charge displacement conditions, said first driving force comprising an electric field many times greater than the minimum field required to shift said ferroelectric means between said conditions.

4. Apparatus of the class described comprising a saturable device having a pair of opposite sense saturated physical states and a transition state therebetween, a first signal, means responsive to said first signal for applying to said device a first driving force of a sense and maximum magnitude sufficient to drive said device into one of said saturated states considerably beyond said transition state, a second signal, means responsive to said second signal for applying to said device during application of said first driving force a second driving force of a sense and maximum magnitude sufficient to drive said device into the other of said saturated states, means for sensing the state of said device, said second signal comprising a signal of alternating polarity having a normal peak magnitude sufficient to produce a peak value of said second driving force greater than a predetermined maximum value of said first driving force whereby said device may be driven to said transition state by combined action of said first driving force and the peak of said second driving force, said sensing means including means for generating a modulating signal in response to the driving of said device to said transition state, and means responsive to said modulating signal for decreasing the peak value of said second driving force to maintain said peak value substantially equal to said first driving force.

5. Apparatus of the class described comprising a saturable device having a pair of opposite sense saturated physical states and a transition state therebetween, a first signal, means responsive to said first signal for applying to said device a first driving force of a sense and maximum magnitude sufficient to drive said device into one of said saturated states considerably beyond said transition state, a second signal, means responsive to said second signal for applying to said device during application of said first driving force a second driving force of a sense and maximum magnitude sufficient to drive said device into the other of said saturated states, means for sensing the state of said device, said second signal comprising a signal of alternating polarity and varying peak amplitude, said second signal having a minimum peak amplitude sufficient to cause said second driving force to drive said device between said saturated physical states in the absence of other driving forces, said sensing means comprising means for generating an output pulse for each shift of said device from one of said saturated states, means for integrating the output of said sensing means to provide said first signal, and output means responsive to said first signal.

6. The structure of claim 2 wherein said device comprises a saturable magnetic element, said saturated and transition states comprising saturated and nonsaturated magnetic states of said element respectively, said first driving force comprising a magnetomotive force having a magnitude of which the minimum magnetomotive force required to saturate said element is a negligibly small fraction.

7. The structure of claim 6 wherein said minimum force is a negligibly small fraction of said second driving force.

8. Apparatus of the class described comprising a saturable device having a pair of opposite sense saturated physical states and a transition state therebetween, a first signal, means responsive to said first signal for applying to said device a first driving force of a sense and maximum magnitude sufficient to drive said device into one of said saturated states considerably beyond said transition state, a second signal, means responsive to said second signal for applying to said device during application of said first driving force a second driving force of a sense and maximum magnitude sufficient to drive said device into the other of said saturated states, means for sensing the state of said device, said device comprising a saturable magnetic element, said saturated and transition states comprising saturated and nonsaturated magnetic states of said element respectively, said first driving force comprising a magnetomotive force having a magnitude of which the minimum magnetomotive force required to saturate said element is a small fraction, said second signal comprising a sequential series of electrical pulses, said second signal responsive means comprising a plurality of coils each having a respectively different number of turns wound on said magnetic element, means responsive to said pulses for sequentially energizing said coils, and means including said pulses and said sensing means for de-energizing the last energized coil in response to a shift of said device from said one saturated state.

9. Apparatus of the class described comprising a saturable device having a pair of opposite sense saturated physical states and a transition state therebetween, a first signal, means responsive to said first signal for applying to said device a first driving force of a sense and maximum magnitude sufficient to drive said device into one of said saturated states considerably beyond said transition state, a second signal, means responsive to said second signal for applying to said device during application of said first driving force a second driving force of a sense and maximum magnitude sufficient to drive said device into the other of said saturated states, means for sensing the state of said device, said device comprising a saturable magnetic element, said saturated and transition states comprising saturated and nonsaturated magnetic states of said element respectively, said first driving force comprising a magnetomotive force having a magnitude of which the minimum magnetomotive force required to saturate said element is a small fraction, said second signal being of alternating polarity and having a normal peak magnitude sufficient to cause said second driving force to have a peak amplitude greater than a predetermined maximum value of said first driving force, said first signal responsive means including a coil on said magnetic element and a transformer having a secondary winding serially connected between said coil and the source of said first signal, a primary winding on said transformer, means for feeding said second signal through said primary winding, said sensing means comprising a second coil on said element for generating a modulating signal in response to shift of said element from said one saturated state, and means responsive to said modulating signal for decreasing the peak magnitude of said second signal to decrease the peak amplitude of said second driving force and maintain said last mentioned peak amplitude substantially equal to said first driving force.

10. Apparatus of the class described comprising a saturable device having a pair of opposite sense saturated physical states and a transition state therebetween, a first signal, means responsive to said first signal for applying to said device a first driving force of a sense and maximum magnitude sufficient to drive said device into one of said saturated states considerably beyond said transition state, a second signal, means responsive to said second signal for applying to said device during application of said first driving force a second driving force of a sense and maximum magnitude sufficient to drive said device into the other of said saturated states, means for sensing the state of said device, said device comprising a saturable magnetic element, said saturated and transition states comprising saturated and nonsaturated magnetic states of said element respectively, said first driving force comprising a magnetomotive force having a magnitude of which the minimum magnetomotive force required to saturate said element is a small fraction, said first and second signal responsive means respectively comprising first and second windings on said element and means for feeding said first and second signals through respective windings, said second signal being of alternating polarity and having a normal peak magnitude sufficient to cause said second winding to generate in said element a second magnetomotive force having peak magnitude greater than a predetermined maximum of the magnetomotive force generated by said first signal and first coil, whereby said element will shift from said one saturated state as said second magnetomotive force approaches its peak, said sensing means comprising a third winding on said element for generating a modulating signal upon the shifting of said element from said one saturated state, and means responsive to said modulating signal for decreasing the normal peak magnitude of said second signal and the peak magnitude of said second magnetomotive force whereby the peak magnitude of said second magnetomotive force signal will be maintained substantially equal to the magnitude of said first magnetomotive force.

11. A saturable magnetic detector comprising a magnetic core having a pair of opposite sense saturated physical states and a transition state therebetween, a source of signal of alternating polarity and varying peak amplitude, coil means coupled with said source for applying to said core an alternating driving force having a minimum peak amplitude sufficient to drive said core between said saturated states beyond said transition state, means for generating an output pulse for each shift of said core into said transition state, means for smoothing said output pulses to provide a second signal of a single polarity, means responsive to said second signal for applying to said core a driving force of one polarity having a magnitude substantially equal to and not greater than the peak amplitude of said alternating driving force, and output means responsive to said second signal.

12. A saturable magnetic modulator comprising a magnetic core having a pair of opposite sense saturated states and a transition state therebetween, means for generating a carrier signal of alternating polarity, driving means responsive to said carrier signal for applying to said core a first driving force of alternating polarity having a peak amplitude sufficient to drive said core between said saturated states substantially beyond said transition state, an input signal, said driving means including means responsive to said input signal for applying to said core a second driving force of a single polarity having a magnitude sufficient to drive said core into one of said saturated states substantially beyond said transition state, said first force having a normal peak magnitude greater than a predetermined maximum magnitude of said second force whereby said core will shift from said one saturated state as alternate cycles of said first force exceed the magnitude of said second force, sensing means for generating a signal pulse for each shift of said core from said one saturated state, means responsive to said sensing means for decreasing the peak magnitude of said carrier signal, and output means responsive to said carrier signal.

13. Apparatus of the class described comprising a saturable device having a saturated physical state and a nonsaturated state, means for applying to said device a driving force which varies in magnitude between a first magnitude at one polarity which is substantially greater than the minimum magnitude of driving force required to drive said device into said saturated state and a second magnitude, whereby said device is driven far into said saturated state when said force is of said first magnitude at said one polarity and is driven toward said transition state when said force approaches said second magnitude, means for sensing a shift of said device from said saturated state into said nonsaturated state, said force applying means comprising means for simultaneously applying to said device a pair of opposing driving force components of relatively varying magnitudes, each of said components having a maximum magnitude substantially greater than said minimum magnitude, and feedback means responsive to said sensing means for varying one of said components to maintain said second magnitude at a value slightly greater than said minimum magnitude.

References Cited in the file of this patent

UNITED STATES PATENTS

| | | |
|---|---|---|
| 2,430,457 | Dimond | Nov. 11, 1947 |
| 2,813,260 | Kaplan | Nov. 12, 1957 |
| 2,819,412 | Kaplan | Jan. 7, 1958 |

OTHER REFERENCES

Report R-212, Ferroelectrics for Digital Information and Storage and Switching, by Dudley Allen Buck, pub. June 5, 1952, by Digital Computer Laboratory, Mass. Institute of Technology, Cambridge, Mass., pp. 26 and 27.